Patented Jan. 31, 1939

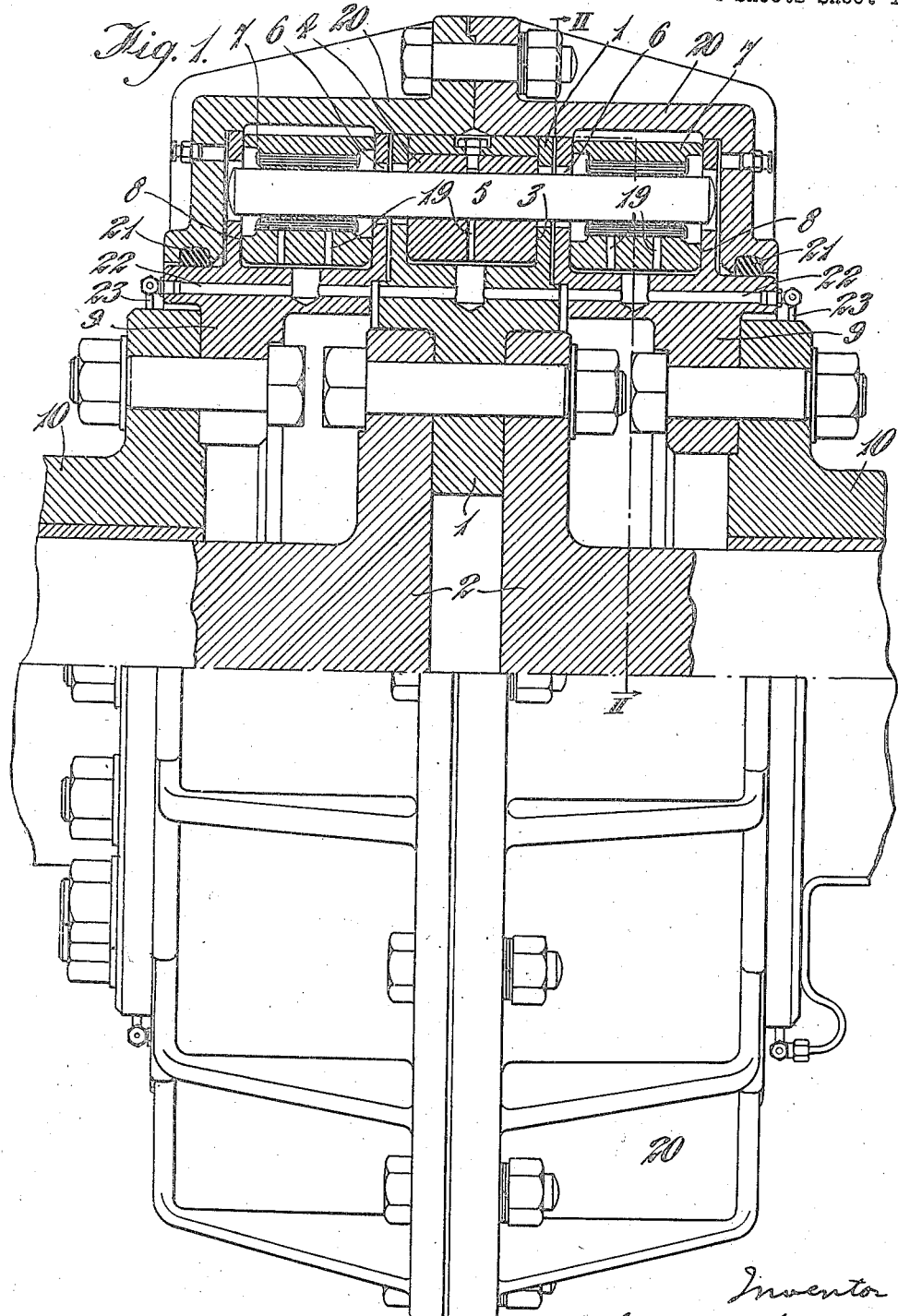

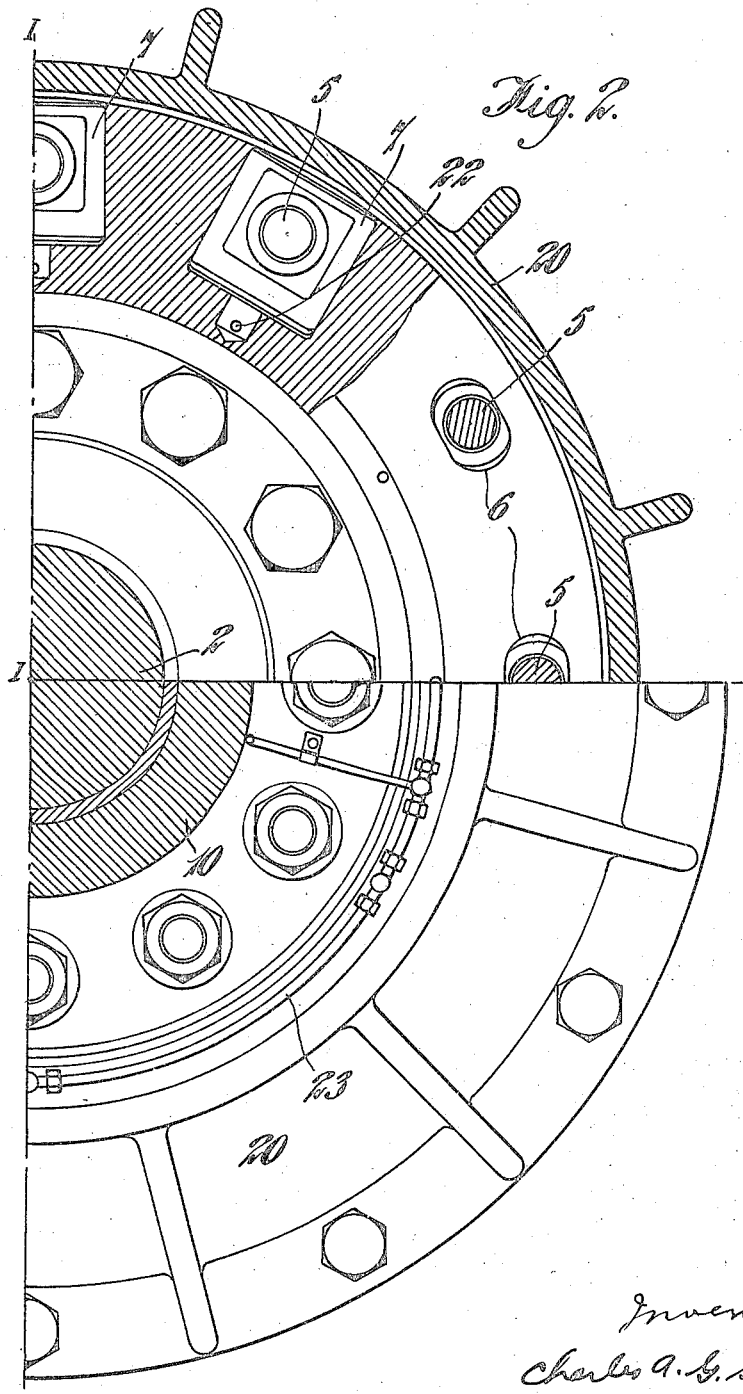

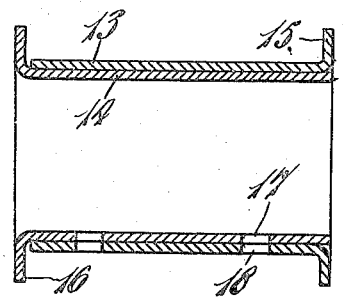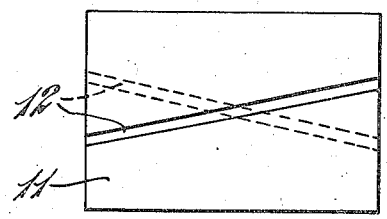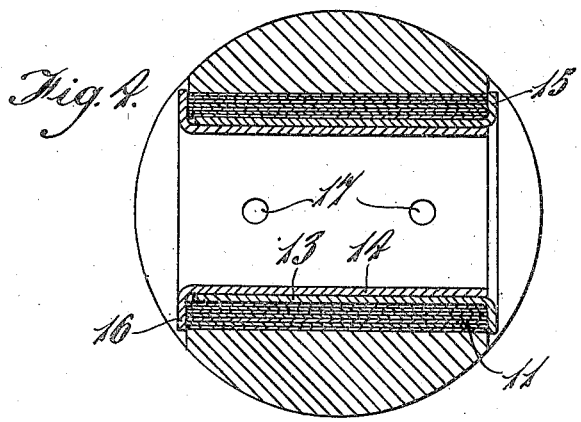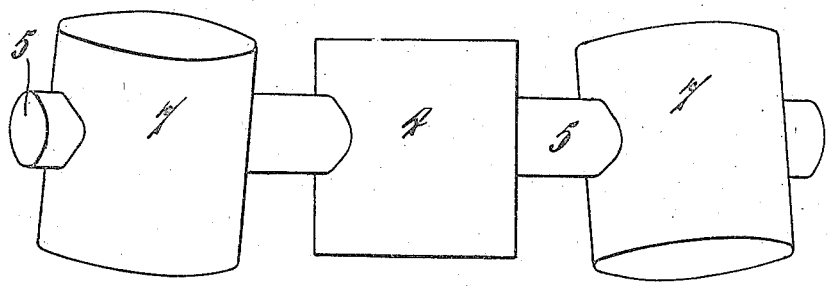

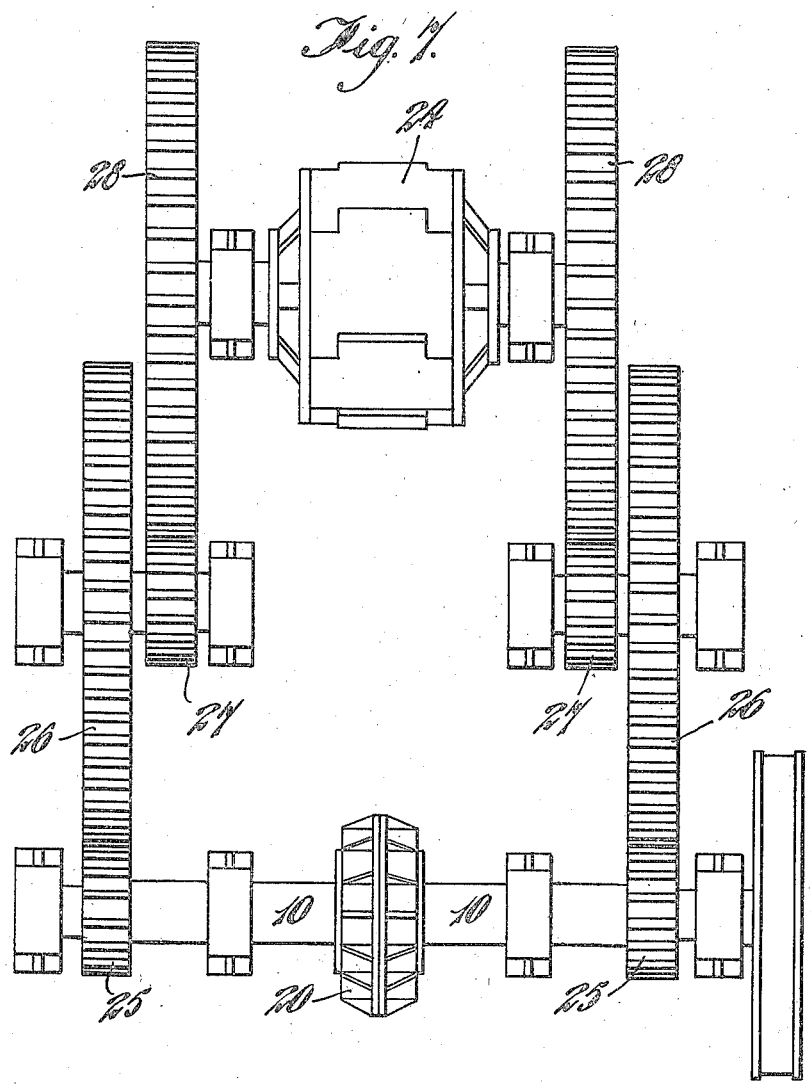

2,145,532

UNITED STATES PATENT OFFICE 2,145,532

DRIVE EQUALIZING COUPLING

Charles Arthur Glendower Standage,
London, England

Application January 3, 1938, Serial No. 183,196
In Great Britain January 5, 1937

3 Claims. (Cl. 64—11)

This invention relates to drive equalizing couplings useful, e. g., in cases where two gear trains are connected to a common driving shaft.

In cases where the first members, e. g., pinions, of the trains have been mounted on the common driving shaft at some distance apart, the drive being applied to one end of such shaft, considerable difficulty has been experienced in arranging the pinions so that both trains of gearing shall commence to drive simultaneously, this being due to a large extent to the variation in the torsional strain of the part of the shaft between the pinions with varying torsional stress in such shaft.

According to my invention, the first members of the trains of gearing are mounted on, e. g., the outer ends of separate shafts, preferably tubular shafts, of substantially equal dimensions, so that their torsional strains under equal torsional stresses shall be substantially the same, and the drive is applied to such tubular shafts at the inner or adjacent ends thereof from an independent driving shaft through an equalizing coupling that permits such tubular shafts to turn relatively to one another until the driving torque on each is the same, this independent shaft being advantageously rotatably arranged within the separate shafts bearing the first members of the trains of gearing and being connected to the prime mover at one end.

In the accompanying drawings—

Figure 1 is a front elevation partly in longitudinal central section and

Figure 2 a side elevation partly in transverse section showing an advantageous form of my improved drive equalizing coupling.

Figure 3 is a diagram illustrating the positions of the rotatable guide members when the outer coupling members are displaced from the position in which the parts of the coupling stand symmetrically reatively to one another.

Figure 4 is a transverse section of one of the rotatable guide members in the outer coupling members, together with the yielding guide bearing for the bar extending therethrough.

Figures 5 and 6 show details of said yielding guide bearing.

Figure 7 shows the improved drive equalizing coupling applied to the driving of the tumbler of a dredger.

The equalizing coupling shown in the drawings comprises a central member 1 mounted on the driving shaft 2 and having an annular series of guide sockets 3, which have their axes radial and which receive relatively rotatable members 4 that have transversely arranged guideways for receiving bars 5 which are fixed or capable of sliding axially in said rotatable members, the guide sockets being cut away on each side as at 6, so as to clear said bars during a limited amount of relative rotation of said rotatable members in each direction. The end portions of said bars are slidably and yieldingly arranged in rotatable members 7 arranged in radial guide sockets 8 in coupling members 9 mounted on the tubular or other separate shafts 10, 10 on opposite sides of the inner coupling member 1, in which the first mentioned annular series of sockets is formed. By this means freedom is afforded the tubular shafts to turn relatively to one another, whilst the driving torque is transmitted to each of them from the first mentioned or median series of rotatable members 4, the bars 5 taking up positions at an angle to that in which they stand with their axes parallel to the common axis of the shafts, this angle depending on the relative positions of the trains of gearing on their shafts, for example as shown diagrammatically in Figure 3.

The sliding and yielding connection between the end portions of the bars and the lateral series of rotatable members is here effected by means of a nested series of spring bushes 11, see Figures 4, 5 and 6, which are each split or divided obliquely, as at 12, the lines of division being arranged alternately in opposite directions in consecutive bushes of the coaxial series as shown in Figure 5. Each coaxial series of spring bushes is arranged in a case or holder formed by two telescopic flanged tubes 13, 14, the flanges 15, 16 when the tubes are assembled being at opposite ends of the case or holder. The outer flanged tube 13 is preferably a tight fit on the inner flanged tube 14, whilst a small clearance, e. g. three thousandths part of an inch, is normally allowed between the successive spring bushes of each series, the aggregate amount of the clearance spaces between the spring bushes of a series allowing an angular displacement of the bar 5 passing therethrough without placing any undue stress on the coupling, and the rotatable members are caused to assume positions relatively to the rotatable member 4 such for example, as shown in Figure 3.

Lubricant is supplied to the clearance spaces and upon displacement of the bars the dimensions of the clearance spaces are altered, the variation in the displacement of the bars causing a pulsation of the oil in the spaces in which the spring bushes are housed, whereby the lubricant serves as a buffer to absorb a part of any shock transmitted to the coupling. Nevertheless, the pressure exerted by the spring bushes upon one another is maintained at a minimum so that under all practical conditions, a film of lubricant is retained in each clearance space.

The provision of spring bushes arranged in this manner enables an even pressure to be exerted upon the rotatable members 7 and moreover, these series of spring bushes form resilient members which, in addition to the buffer action of the lubricant, also tends to absorb any shock that may be transmitted to the coupling.

Registering lubricating holes 17 and 18 are provided in the flanged tubes, through the inner tubes 14 of which the rods 5 extend, and lubricant is fed to these holes from holes 19 in the rotatable members 7 through the spaces in which the nested spring bushes are housed. Holes 19 are also provided in the rotatable members 4 to convey lubricant to the bearing surfaces therein for the bars 5.

The members bearing the annular series of radial sockets are advantageously provided with an annular peripheral casing 20 having flexible packing material 21 around its outer borders, so as to enable the rotatable members and associated parts to move in an oil bath.

The oil holes 19, 19 communicate with oil passages 22, 22 in the sockets 3, 8, such passages being in communication with oil supply pipes 23, 23.

Figure 7 shows the application of my improved equalizing coupling to the driving of the tumbler 24 of a dredger chain through sets of spur gearing 25, 26, 27, 28.

I claim:

1. A drive equalizing coupling comprising a central member adapted to be mounted on a driving shaft and having an annular series of guide sockets which have their axes radial relatively to the axis of the coupling, members rotatable in said guide sockets, bars arranged in said rotatable members with their axes transverse to the axes of said sockets, lateral coupling members, which are arranged on opposite sides of said central member and are adapted to be connected to driven members respectively and each having an annular series of guide sockets corresponding to those in the central member, rotatable members which are arranged in said guide sockets in the coupling members and corresponding to those in the central member and in which the end portions of said bars are slidably arranged, and resilient means arranged between the end portions of said bars and the last named rotatable members.

2. A form of the coupling claimed in claim 1, wherein the said resilient means consist of nested series of spring bushes arranged in the last named rotatable members and having the end portions of the bars slidable therein.

3. A form of the coupling claimed in claim 1, wherein the said resilient means consist of nested series of spring bushes arranged in the last named rotatable members and having the end portions of the bars slidable therein, and pairs of telescopic tubes forming holders for said nested series of spring bushes, the tubes of each pair each having a flange at its outer end.

CHARLES ARTHUR
GLENDOWER STANDAGE.